United States Patent
Hunter et al.

[11] Patent Number: 5,999,209
[45] Date of Patent: Dec. 7, 1999

[54] RAPID HIGH RESOLUTION IMAGE CAPTURE SYSTEM

[75] Inventors: Ian W. Hunter, Lincoln; Colin J. H. Brenan, Marblehead, both of Mass.

[73] Assignee: Pacific Title and Mirage, Inc., Wayne, Pa.

[21] Appl. No.: 08/893,018

[22] Filed: Jul. 15, 1997

Related U.S. Application Data

[60] Provisional application No. 60/022,861, Jul. 15, 1996.

[51] Int. Cl.[6] ........................................... H04N 7/15
[52] U.S. Cl. ............................. 348/96; 348/104
[58] Field of Search .................. 348/96, 97, 98, 348/104; H04N 7/15

[56] References Cited

U.S. PATENT DOCUMENTS

| | | | |
|---|---|---|---|
| 4,877,297 | 10/1989 | Yeh | 359/11 |
| 5,686,960 | 11/1997 | Sussman | 348/218 |
| 5,715,059 | 2/1998 | Guerra | 356/371 |
| 5,768,242 | 6/1998 | Juday | 369/103 |

FOREIGN PATENT DOCUMENTS

| | | |
|---|---|---|
| 24 42 273 | 3/1976 | Germany . |
| 2 243 264 | 10/1991 | United Kingdom . |
| 2 270 230 | 3/1994 | United Kingdom . |
| WO 86 05641 | 9/1986 | WIPO . |

*Primary Examiner*—Howard Britton
*Attorney, Agent, or Firm*—Bromberg & Sunstein LLP

[57] ABSTRACT

An electronic imaging system for rapid high-resolution scanning of images such as those recorded on movie films. A multiple beam generating arrangement provides an array of light beams incident on one side of the image, while a corresponding array of light-sensing elements is disposed on the opposing side of the image. An output processor provides a value of light intensity as a function of beam position for the entire region of the image scanned by the beam array.

12 Claims, 7 Drawing Sheets

RAPID HIGH RESOLUTION IMAGE CAPTURE SYSTEM

The present application claims priority from U.S. provisional application number 60/022,861, filed Jul. 15, 1996, which is herein incorporated by reference.

TECHNICAL FIELD

The present invention relates to electronic imaging systems, and more particularly to systems for rapid high resolution scanning of images, including those recorded on movie films.

SUMMARY OF THE INVENTION

The present invention in a preferred embodiment provides a rapid high resolution image capture system. The system of this embodiment has a multiple beam generation arrangement for generating a plurality of beams in a two-dimensional beam array. A scanning arrangement causes the beams in the beam array to scan the image in lines, in a scan direction, in response to a scanning signal. (In this connection it is possible to determine an average beam width for the beams as measured in the direction of scan.) The system also employs a two-dimensional sensing array of light-sensing elements. The number of elements in the sensing array is equal to the number of the plurality of beams. Each element has a light intensity output value and a center and is disposed so that such element senses light from the image that is associated substantially with a unique one of the beams in the beam array. The spacing between adjacent beams in the beam array is such that the corresponding spacing between centers of adjacent elements is substantially wider than the average beam width. The system also has an output processor, in communication with the scanning signal and the light-sensing elements, for providing the output value of each element as a function of the position of the beam associated with such element, so that light intensity values are provided by the sensing array as a function of beam position for the entire region of the image scanned by the beam array.

It is possible to employ a plurality of subsystems mounted in an assembly. Each subsystem includes a beam array, a scanning arrangement, and a sensing array to permit scanning of the image when it is aligned with such subsystem. In addition a drive arrangement is provided for moving the image relative to the assembly to cause the image to be aligned successively with each subsystem, so that the image may be scanned by each subsystem. This configuration is particularly useful for scanning movie film, where successive frames can be processed by successive subsystems, and all subsystems can be operational simultaneously to provide high throughput.

Using the approach of the previous paragraph, there may be provided a separate subsystem for each primary light color. In addition there may be provided n separate subsystems, n being an integer equal to or greater than 2, each subsystem configured to scan a given line j mod n of the image, j being an integer equal to or less than n. In the special case when n=2, separate subsystems are employed to scan odd and even lines of the image. When also a separate subsystem is used for each primary light color, the result is a total of six subsystems: red, blue, and green subsystems each scanning odd lines of the image, and red, blue, and green subsystems each scanning even lines of the image.

In a further embodiment the scanning arrangement includes a plurality of acousto-optic devices, and the multiple beam generation arrangement includes a holographic optical element.

BRIEF DESCRIPTION OF THE DRAWINGS

The invention will be more readily understood by reference to the following drawings, taken with the accompanying detailed description, in which.

DETAILED DESCRIPTION OF SPECIFIC EMBODIMENTS

Figure 1:
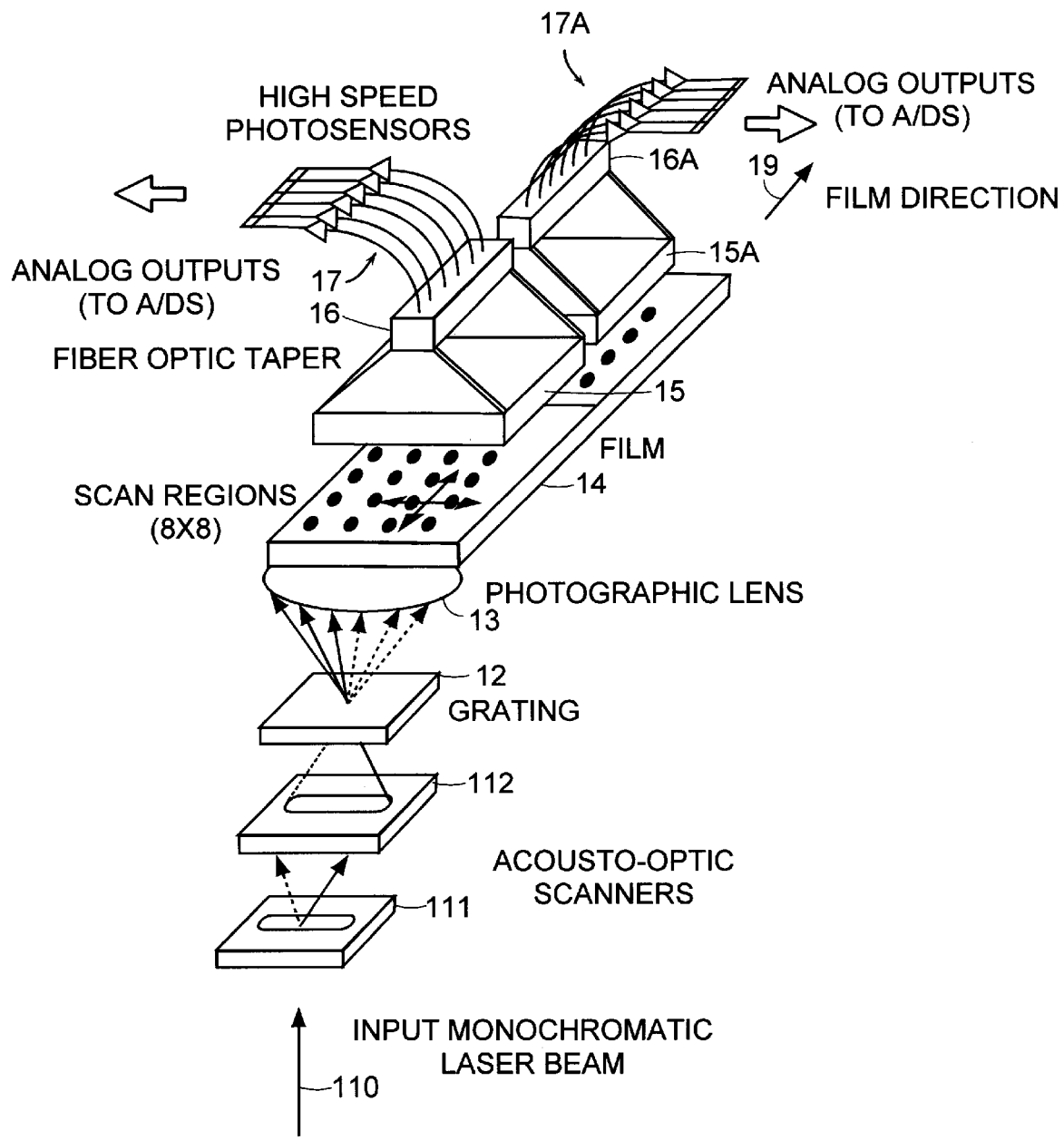
FIG. 1 is a diagram showing the configuration of an image capture system in accordance with a preferred embodiment of the present invention.

FIG. 1 is a diagram showing the configuration of an image capture system in accordance with a preferred embodiment of the present invention. The image being captured is a frame on movie film 14, which can be advanced a frame at a time in direction 19. The image is illuminated by light from monochromatic laser beam 110. The beam 110 is deflected successively by first and second acousto-optic devices 111 and 112 respectively. Thereafter the beam enters holographic optical element (HOE) 12, which causes the beam to emerge as a two-dimensional array of beams, having 8×8 (or 4×4) elements. The array of beams is caused to scan the image in the frame of film 14 by suitable driving of the acousto-optic devices 111 and 112. The deflection caused by an acousto-optic device is a function of the frequency of an ac signal applied to it; the ac signals applied to devices 111 and 112 are therefore varied in frequency to cause the beam entering HOE 12 to vary in angle relative to the surface of the HOE while always entering the HOE at the sane location. The array of beams passes through lens 13, which is designed to assure that the array of beams is caused to scan the image in the pertinent frame in film 14.

A first optical reading head 15 is disposed over the film 14 to receive light passing through the film from the array of beams emerging from lens 13. Optionally, an additional similar reading head 15A, or a plurality of additional similar reading heads, may be employed in association with a corresponding arrangement for scanning an array of beams through the film over which the reading head(s) is (are) disposed. The reading head is divided into a number of regions that is the same as the number of beams in the array of beams. Each region of the reading head receives light attributable to a unique beam in the array of beams. Associated with each region of the reading head is a tapered fiber optic bundle configured to direct light from such region to a unique photosensor providing an electrical output indicative of the intensity of the light currently falling on such region as a result of the particular position of the beam associated with the region (and therefore of the position of the beam in the image). To enhance the signal-to-noise ratio, it is within the scope of the invention to provide confocal optics that reject scattered light. In a preferred embodiment, the photosensor is an avalanche photodiode (available, for example, from EG&G, Wellesley, Mass.,), which is characterized by high sensitivity, low noise, and large frequency bandwidth. The photosensors are housed in case 16, and electrical analog outputs from them are provided over lines 17. Similarly reading head 15A has case 16A for its photosensors, and outputs from them are provided over lines 17A.

Figure 2:
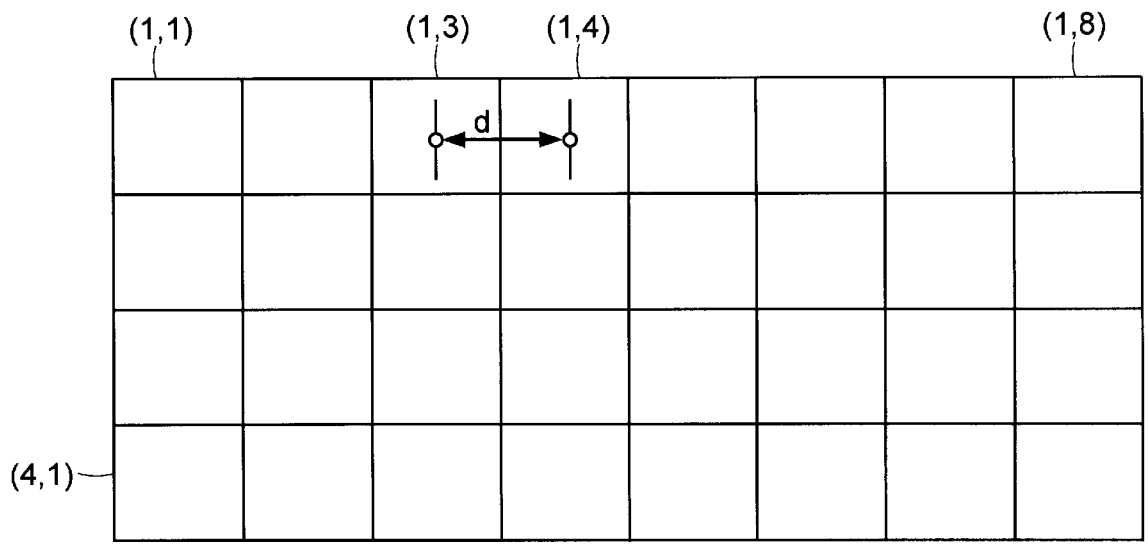
FIG. 2 is a diagram illustrating the geometry of the sensing array in relation to the beam array in the system of FIG. 1.

FIG. 2 is a diagram illustrating the geometry of the sensing array of reading head 15 in relation to the beam array in the system of FIG. 1. Here half of the 64 regions of the reading head 15 are shown, namely regions in the first row (1,1) through (1,8), second row (2,1) through (2,8), third row (3,1) through (3,8), and fourth row (4,1) through (4,8). As shown in region (1,1), each region is scanned over a series of scan lines (illustrated schematically by dotted lines) by its corresponding beam in the array of beams, with the scanning caused by operation of the two acousto-optic devices 111 and 112. All the regions are scanned simultaneously by the beams, and the outputs of the photosensors over lines 17 are provided simultaneously. For a 35 mm movie with a frame containing an image approximately 30 mm wide, a beam size of approximately 5 microns or smaller is necessary to achieve a resolution of 6000 horizontal pixels per frame. On the other hand, although the present invention requires a beam size of this general dimension (at least in the direction of scan) for such resolution, the light sensitive region can have dimensions that are many times larger the beam size, because (i) each region is uniquely associated with a beam and (ii) the beam position is itself known and in fact determined electronically by operation of the acousto-optic devices 111 and 112. Therefore, although an exact image pixel location cannot be identified by the photosensor associated with a given region, the position of the beam is known from the modulation signal on the acousto-optic devices, and this data is used to correlate the intensity output of the photosensor with an actual pixel location. Indeed with this arrangement, the spacing d between the center, of adjacent regions—shown in FIG. 2 as the spacing between regions (1,3) and (1,4)—is ⅛th of the 30 mm frame width, or about 3.8 mm. In other words the smallest photosensitive area required by the invention in this embodiment is nearly three full orders of magnitude greater than the beam size. Thus the present embodiment is capable of providing a resolution of 6000× 4000 pixels per frame of 35 mm film. This arrangement may similarly provide an intensity resolution of 14 bits/color/ pixel with a scanning rate of 11 color frames per second.

Figure 3:
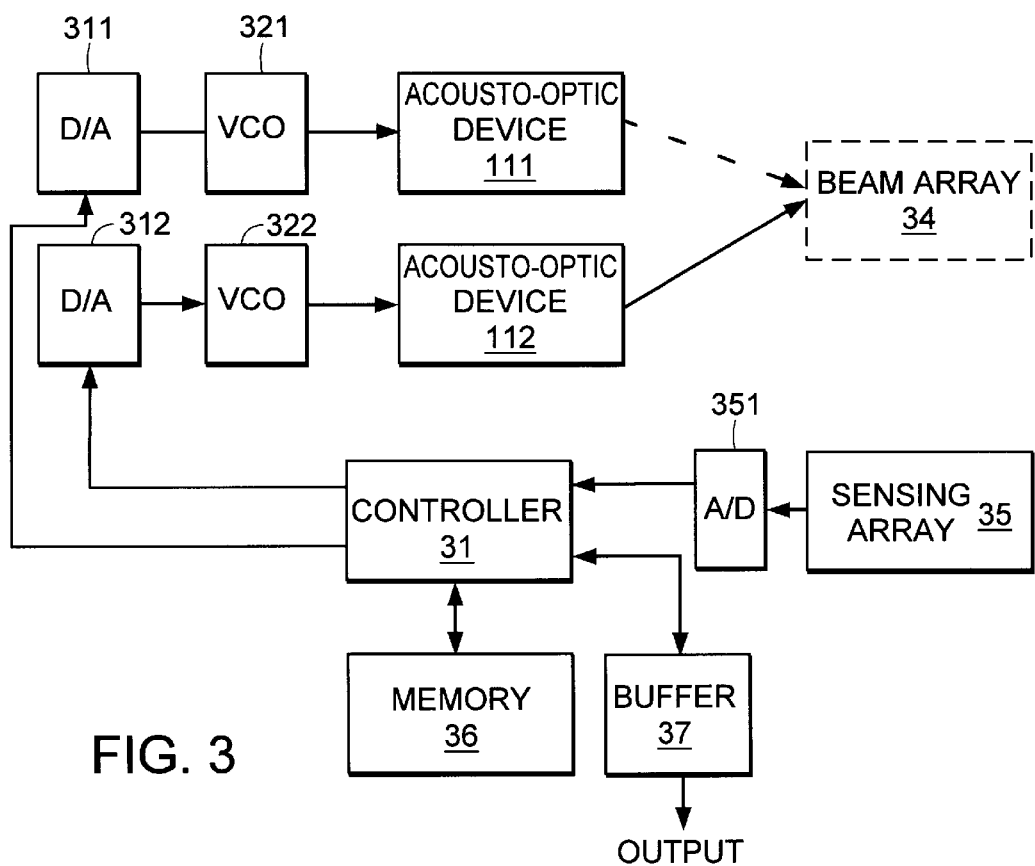
FIG. 3 is a block diagram of the principal electronic components of the system of FIG. 1.

FIG. 3 is a block diagram of the principal electronic components of the system of FIG. 1. Each acousto-optic device 111 and 112 is driven by a voltage-controlled oscillator 321 and 322 respectively, which in turn receives a voltage signal from a D-to-A converter 311 and 312 respectively that is driven by controller 31 so as to cause scanning of the beam array 34. The same controller 34 controls the sampling and storage of signals from A-to-D converter 351 that are derived from the photosensors in sensing array 35 in synchronization with the scanning signals provided to the acousto-optic devices 111 and 112. The controller causes storage of the sampled signals in memory 36, and the signals can be read out of memory and provided as an output through buffer 37. Although only single arrows have been shown for data flow, it will be appreciated that all photosensors can be read simultaneously, and therefore can be sampled and stored simultaneously, and read out simultaneously, thereby providing a high-speed, high-bandwidth, high-resolution system.

Figure 4:
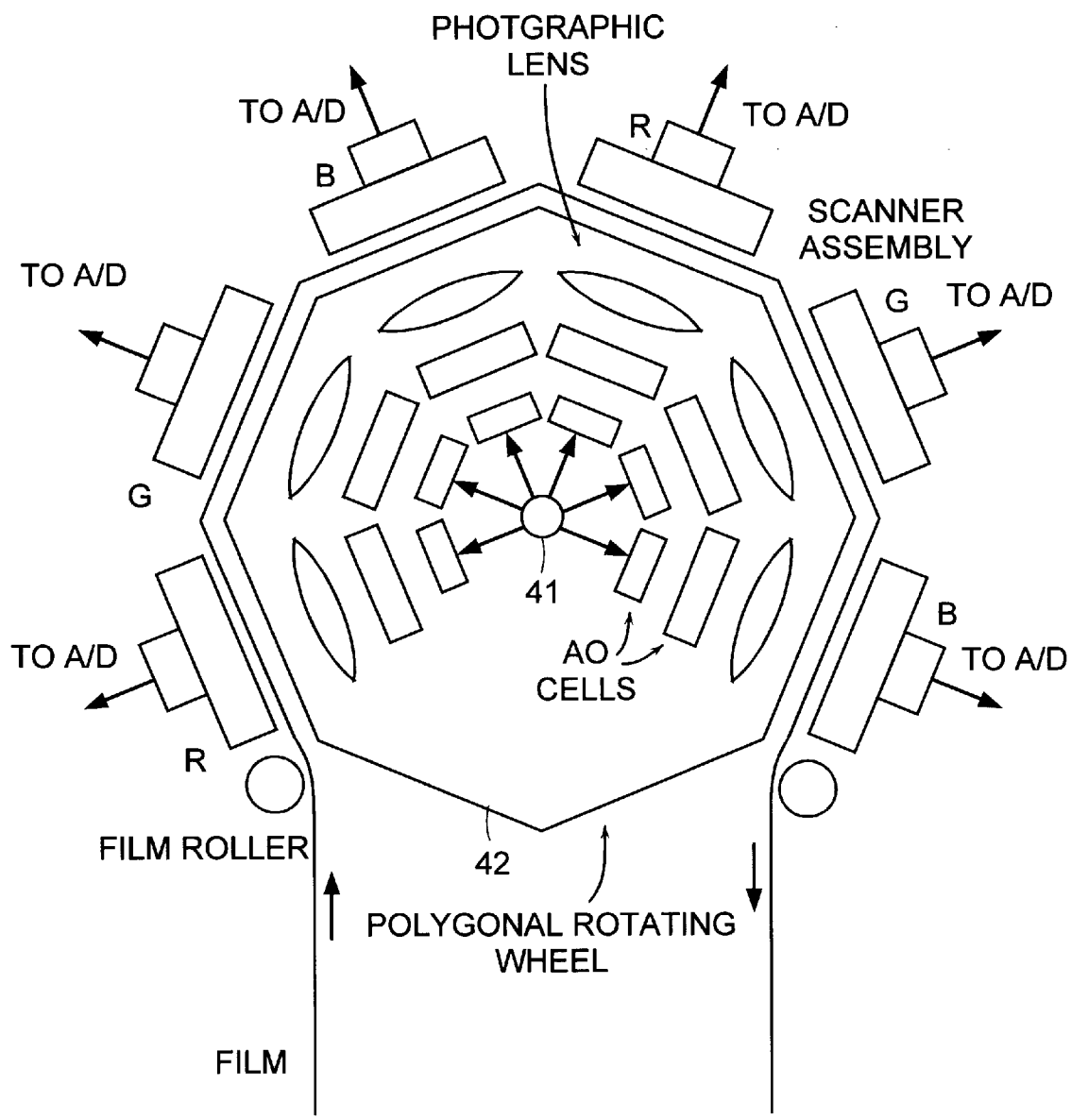
FIG. 4 is a diagram illustrating the use of six subsystems for color image capture of images from movie film in accordance with a further embodiment of the present invention.

FIG. 4 is a diagram illustrating the use of six subsystems for color image capture of images from movie film in accordance with a further embodiment of the present invention. The embodiment of the previous figures can be realized in a system providing separate subsystems for scanning and reading multiple frames (here, six) simultaneously. A common source 41 of white light is used in connection with a structure provided by rotating polygon 42, which houses six similar beam-scanning array arrangements for all six subsystems. As the polygon 42 is rotated, a given frame with its beam-scanning array arrangement is advanced to a new position in which a different sensing array can provide new output data. In this embodiment, a separate sensing array is used for each primary light color: red, green, and blue. In addition, a separate set of sensing arrays is used for odd and even scan lines. In this manner, the throughput of the system of FIG. 1 can be multiplied by a factor of six.

Figure 5:
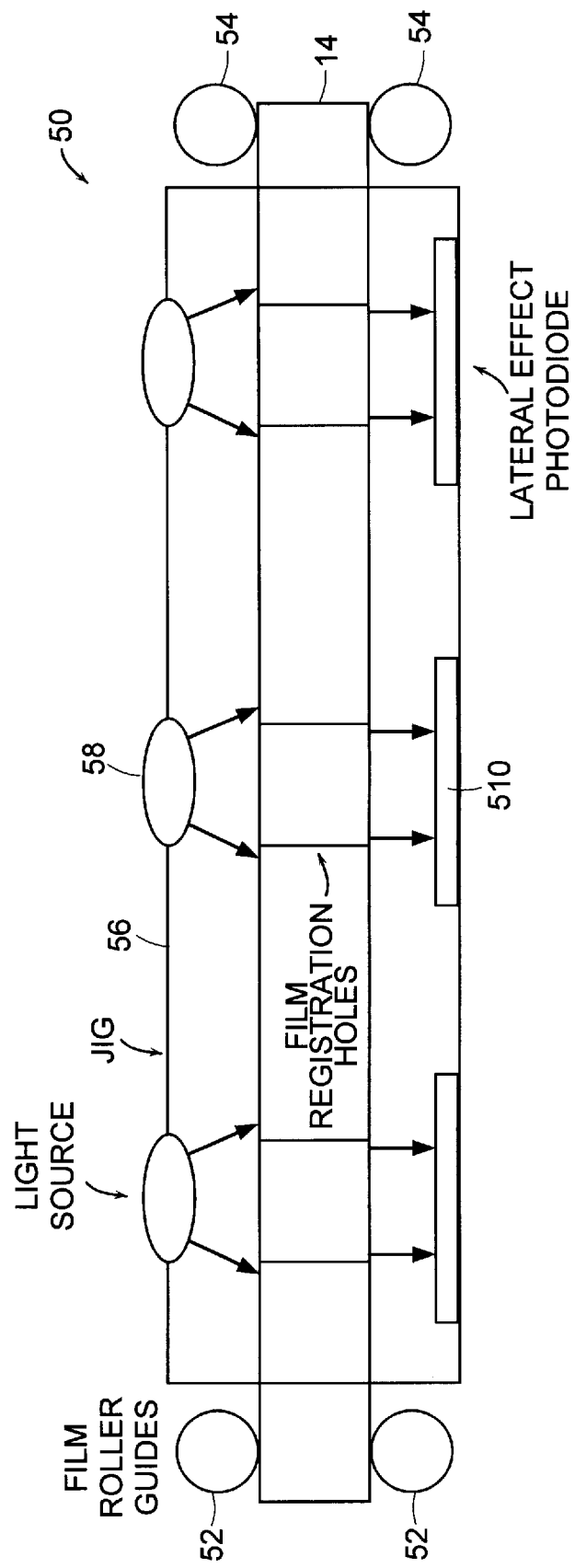
FIG. 5 is a schematic diagram, in side view, of a frame registration mechanism employed in accordance with a further embodiment of the present invention.

Since mechanical pin-based positioning schemes for advancing and registering film frames may be inadequate at high speeds, a film registration mechanism, designated generally by numeral 50 irL FIG. 5, is provided in accordance with an embodiment of the invention. Referring now to FIG. 5, a side view is shown of film registration mechanism 50, with film 14 advanced laterally by roller guides 52 and 54 onto a mechanical stage (shown in FIG. 6). The stage is mounted in jig 56 and may be accurately positioned with respect to jig 56. Jig 56 contains light sources 58 of one side of film 14, and lateral effect photodiodes (LEPDs) 510 on the opposite side of film 14. Light sources 58 may be light emitting diodes, for example, although the use of any other light sources is within the scope of the appended claims. Light sources 58 are arranged such that each light source illuminates one film alignment hole, when a film is loaded in the scanner. The corresponding LEPD 510, on the opposite side of film 14, records the two-dimensional position of the shadow of the alignment hole projected onto the surface of the LEPD.

The requisite registration tolerance may be much less than the width of a pixel, corresponding, in the case of a high density image scan of an Academy format digitized image (4000×6000 pixels), to a tolerance of less than 4 $\mu$m. The relative distance between each LEPD/light source pair is known, by machining tolerances in the production of jig 56, to the requisite tolerance. Thus, each LEPD/light source pair serves as an accurate fiduciary mark for positioning of the film sprockets.

Figure 6:
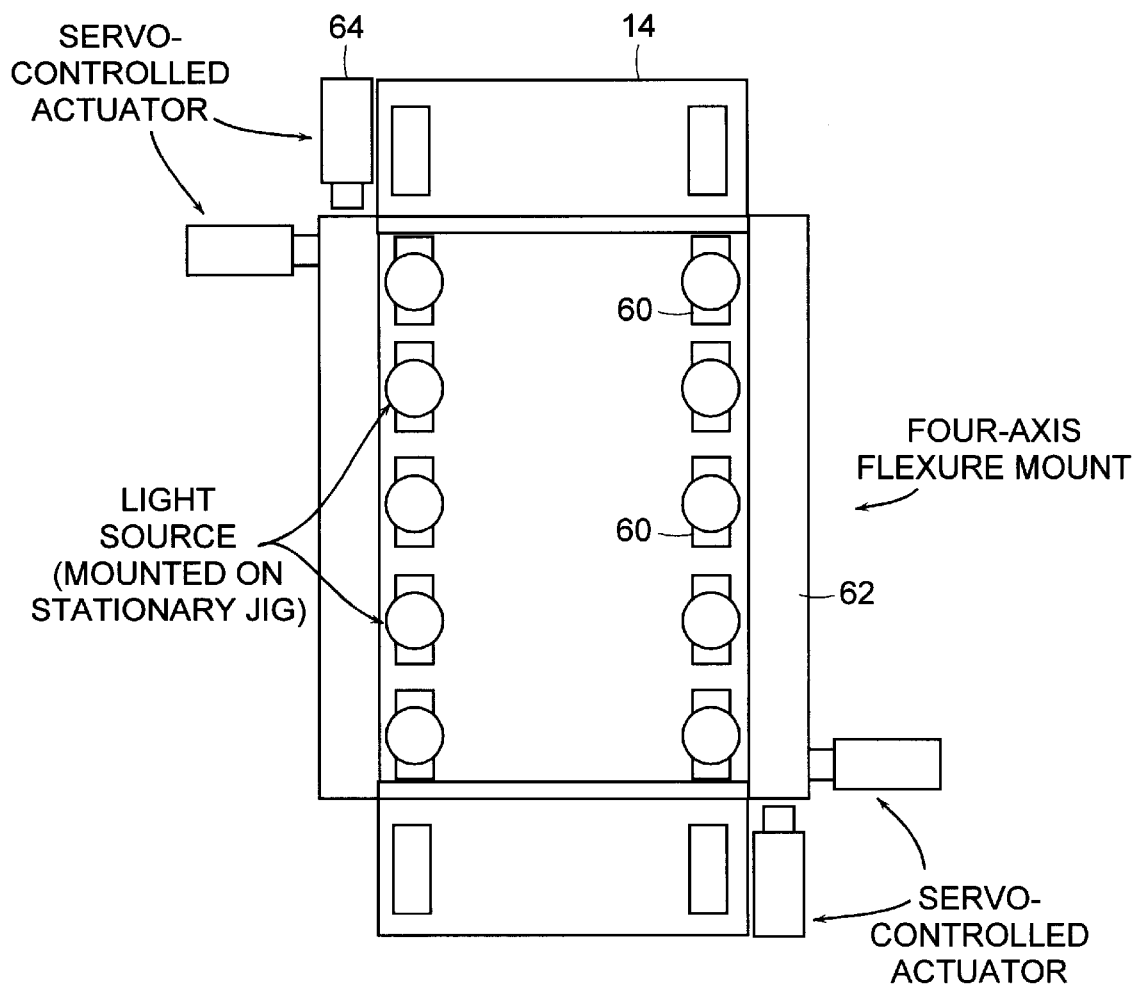
FIG. 6 is a schematic diagram, in top view, of the frame registration mechanism of FIG. 5.

FIG. 6 shows a top view of the film registration mechanism of FIG. 5. Film 14 is shown with film alignment holes 60 positioned between respective pairs of light sources 58 and corresponding LEPDs located beneath film 14. Which light sources 58 and LEPDs 510 (shown in FIG. 5) are fixed with respect to stationary jig 56, film 14 is advanced on stage 62 which is comprised on flexure bearings that give it four degrees of freedom (two rotational and two lateral) in the plane of the film. Stage 62 is actuated by servo-controlled actuators 64 which may, by way of example, be linear motors. The servo-control allows the positioning accuracy to exceed the <½ pixel misalignment criterion. The servo-control mechanism, by way of example, may have an accurate, high position dynamic range, high bandwidth position sensor (such as a laser interferometer or a confocal optical position sensor) integrated into a linear electromagnetic motor.

Figure 7:
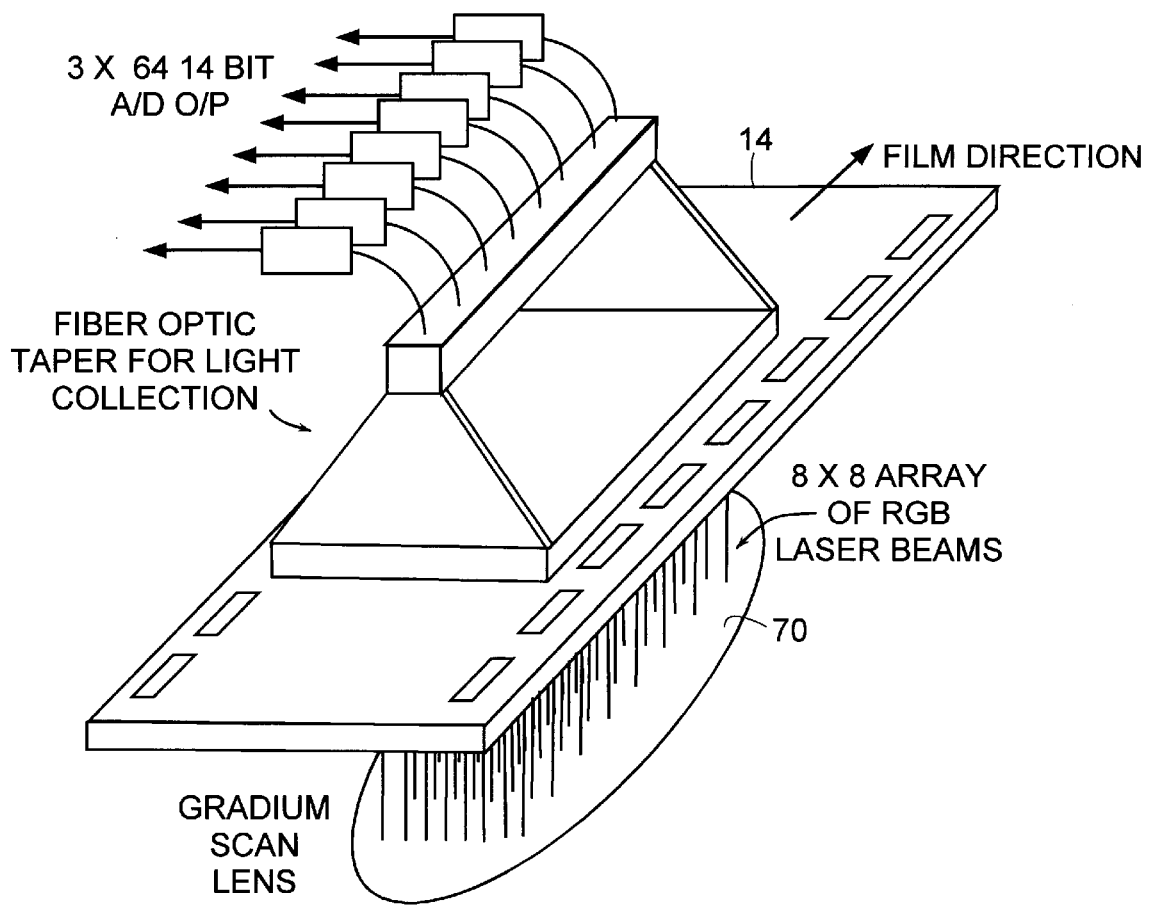
FIG. 7 is a diagram showing the configuration of an image capture system in accordance with a preferred embodiment of the present invention.
Figure 8:
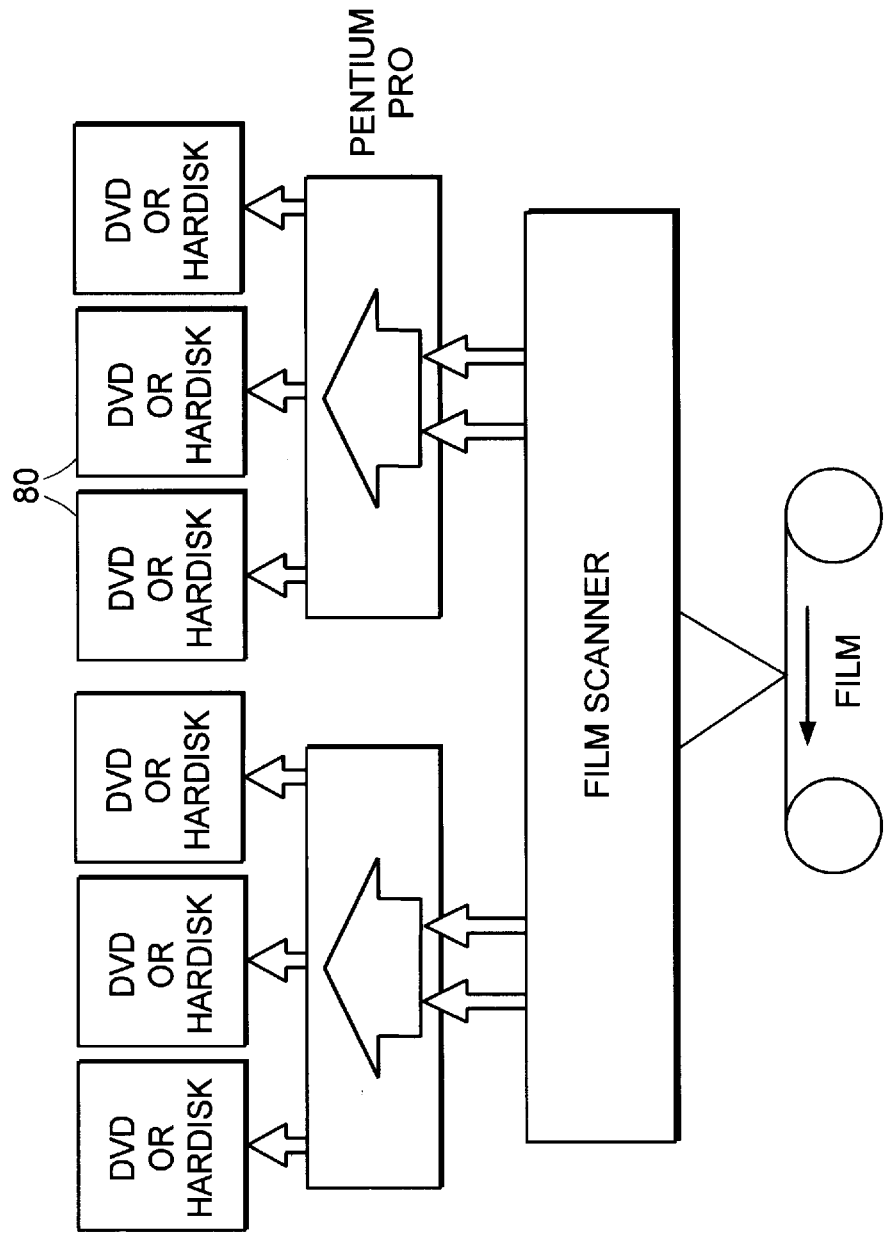
FIG. 8 is a block diagram of the architecture of a high-throughput film scanning system in accordance with an embodiment of the present invention.

FIG. 7 shows an alternative embodiment of the invention showing the illumination of film 14 by arrays 70 of lasers having light outputs 72 corresponding to primary light colors. FIG. 8 shows a schematic diagram of a preferred embodiment of the data architecture of the invention, whereby the digitized movie images are rapidly transferred to a plurality of digital video discs or hard disks 80.

What is claimed is:

1. A rapid high resolution image capture system, the system comprising:

(a) a multiple beam generation arrangement for generating a plurality of beams in a two-dimensional beam array;

(b) a scanning arrangement for causing the beams in the beam array to scan the image in lines, in a scan direction, in response to a scanning signal, the beams having an average beam width measured in the direction of scan;

(c) a two-dimensional sensing array of light-sensing elements, the number of elements equal to the number of the plurality of beams, each element having a light intensity output value and a center and being disposed so that such element senses light from the image that is associated substantially with a unique one of the beams in the beam array;

wherein the spacing between adjacent beams in the beam array is such that the corresponding spacing between centers of adjacent elements is substantially wider than the average beam width; and (d) an output processor, in communication with the scanning signal and the light-sensing elements, for providing the output value of each element as a function of the position of the beam associated with such element, so that light intensity values are provided by the sensing array as a function of beam position for the entire region of the image scanned by the beam array.

2. A system according to claim 1, wherein the scanning arrangement includes a plurality of acousto-optic devices.

3. A system according to claim 1, wherein the multiple beam generation arrangement includes a holographic optical element.

4. A system according to claim 1, further comprising a frame registration mechanism for accurately registering the position of an image on a film having alignment holes, the frame registration mechanism comprising:

(a) a mechanical stage for supporting the film;

(b) a plurality of light sources disposed on a first side of the film; and (c) a plurality of lateral effect photodiodes, each lateral effect photodiode disposed on a second side of the film, opposite to a corresponding light source, so that the positions of a plurality of film alignment holes may be accurately determined.

5. A system according to claim 1, further comprising a stage for supporting an image on a film, the stage comprising:

(a) a flexure mount for aligning the film with respect to four degrees of freedom; and (b) a plurality of motors for positioning the flexure mount.

6. A system according to claim 1, comprising (a) a plurality of subsystems mounted in an assembly, each subsystem including a beam array, a scanning arrangement, and a sensing array to permit scanning of the image when it is aligned with such subsystem; and (b) a drive arrangement for moving the image relative to the assembly to cause the image to be aligned successively with each subsystem, so that the image may be scanned by each subsystem.

7. A system according to claim 6, comprising a separate subsystem for each primary light color.

8. A system according to claim 6, wherein the scanning arrangement includes a plurality of acousto-optic devices.

9. A system according to claim 6, wherein the multiple beam generation arrangement includes a holographic optical element.

10. A system according to claim 6, comprising n separate subsystems, n being an integer equal to or greater than 2, each subsystem configured to scan a given line j mod n of the image, j being an integer equal to or less than n.

11. A system according to claim 10, wherein n=2, so that separate subsystems are employed to scan odd and even lines of the image.

12. A system according to claim 11, further comprising a separate subsystem, for each primary light color, scanning odd lines of the image and a separate subsystem, for each primary light color, scanning even lines of the image, so that six subsystems are employed.

* * * * *